(12) United States Patent
Egedal et al.

(10) Patent No.: US 11,668,279 B2
(45) Date of Patent: Jun. 6, 2023

(54) CONTROLLING WIND TURBINES IN PRESENCE OF WAKE IMPLICATIONS

(71) Applicant: Siemens Gamesa Renewable Energy A/S, Brande (DK)

(72) Inventors: Per Egedal, Herning (DK); Pieter M. O. Gebraad, København (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/273,380

(22) PCT Filed: Sep. 6, 2019

(86) PCT No.: PCT/EP2019/073860
§ 371 (c)(1),
(2) Date: Mar. 4, 2021

(87) PCT Pub. No.: WO2020/053096
PCT Pub. Date: Mar. 19, 2020

(65) Prior Publication Data
US 2021/0207580 A1    Jul. 8, 2021

(30) Foreign Application Priority Data
Sep. 10, 2018    (EP) .................................. 18193507

(51) Int. Cl.
*F03D 7/02*    (2006.01)
*F03D 7/04*    (2006.01)

(52) U.S. Cl.
CPC ........... *F03D 7/0204* (2013.01); *F03D 7/048* (2013.01); *F05B 2270/329* (2013.01)

(58) Field of Classification Search
CPC ............................... F03D 7/048; F03D 7/0204
See application file for complete search history.

(56) References Cited

U.S. PATENT DOCUMENTS 9,512,820 B2 * 12/2016 Obrecht ................ F03D 7/0204
10,364,796 B2 * 7/2019 Brath ..................... F03D 7/0224
(Continued)

FOREIGN PATENT DOCUMENTS

EP    2 314 869 A1    4/2011
EP    2 767 710 A2    8/2014
(Continued)

OTHER PUBLICATIONS

European Search Report and Written Opinion of the European Searching Authority dated Mar. 14, 2019 for Application No. 18193507.3.
(Continued)

*Primary Examiner* — Justin D Seabe
(74) *Attorney, Agent, or Firm* — Schmeiser, Olsen & Watts LLP (57) ABSTRACT

Provided is a wind park, a wind park controller, and a method for controlling a first wind turbine of a plurality of wind turbines of a wind park, wherein a second wind turbine of the plurality of wind turbines can be affected by a wake region caused by the first wind turbine which is positioned upstream of the second wind turbine. A current yaw state is determined and is selected from at least one of: a) an actual rotor yaw misalignment angle of the first wind turbine, wherein the actual rotor yaw misalignment angle is an angle between a rotating axis of a rotor of the first wind turbine and a current wind direction at the rotating axis upstream of the first wind turbine, b) an identifier representing whether the actual rotor yaw misalignment angle is either in a range of positive yaw misalignment angles or of negative yaw misalignment angles.

14 Claims, 6 Drawing Sheets

(56) References Cited

U.S. PATENT DOCUMENTS

| | | | | |
|---|---|---|---|---|
| 10,465,655 B2* | 11/2019 | Brake | ............... | F03D 7/0204 |
| 10,612,519 B2* | 4/2020 | Franke | ............... | F03D 7/048 |
| 11,078,884 B2* | 8/2021 | Nielsen | ............... | F03D 17/00 |
| 2013/0317748 A1* | 11/2013 | Obrecht | ............... | F03D 7/048 |
| | | | | 702/3 |
| 2016/0215759 A1* | 7/2016 | Fleming | ............... | F03D 7/046 |

FOREIGN PATENT DOCUMENTS

| | | |
|---|---|---|
| EP | 3 037 657 A1 | 6/2016 |
| EP | 3533997 A1 | 9/2019 |
| EP | 3536948 A1 | 9/2019 |
| EP | 3578808 A1 | 12/2019 |

OTHER PUBLICATIONS

Park Jinkyoo et al: "A data-driven, cooperati ve wind farm control to maximize the total power production", Applied Energy, Elsevier Sc Ience Publishers, GB, vol. 165, Dec. 31, 2015 (Dec. 31, 2015), pp. 151-165, XP029400213. ISSN: 0306-2619, DOI: 10.1016/J. APENERGY .2015.11.064 the whole document.

International Search Report and Written Opinion dated Dec. 4, 2019 for PCT/EP2019/073860.

\* cited by examiner

CONTROLLING WIND TURBINES IN PRESENCE OF WAKE IMPLICATIONS

CROSS-REFERENCE TO RELATED APPLICATIONS

This application claims priority to PCT Application No. PCT/EP2019/073860, having a filing date of Sep. 6, 2019, which is based on EP Application No. 18193507.3, having a filing date of Sep. 10, 2018, the entire contents both of which are hereby incorporated by reference.

FIELD OF TECHNOLOGY

The following relates to a method and to a wind park controller for controlling at least one wind turbine in a wind park comprising plural wind turbines and relates further to a wind park comprising the wind park controller.

BACKGROUND

A wind park comprises a plurality of wind turbines. Some wind turbines are located downstream of other wind turbines, depending on a current wind direction. The upstream wind turbines may reduce the wind speed and wind energy experienced by the downstream wind turbines. At the downstream wind turbines also a turbulence of the wind may increase. A wind shadow region downstream or behind an upstream wind turbine may also be referred to as a wake region, or simply wake, of that upstream wind turbine.

In order to reduce production losses caused by wind turbine wakes in wind farms, optimised blade pitch, rotor speed, power production set-points, rotor tilt and/or yaw offsets or other control settings on the wind turbines can be used.

When wind turbine wakes have an effect on another one or more other wind turbines, the upstream wind turbine may adapt its control settings to reduce wake-induced loads or to optimise total production of the wind farm. These optimised settings are most commonly based on wind farm models that assume knowledge of the wind conditions coming into the wind farm and the layout of the wind farm. Generally, the optimization settings are based on the situations when all wind turbines are in operation.

In a conventional control system for optimizing power output or load of the entire wind park, upstream turbines will be identified that may have an impact on other downstream wind turbines and the respective upstream turbines are controlled.

One control action may be setting the yaw angle of the upstream wind turbine. In this document the term "yaw misalignment angle" is used to refer to a current yaw state of the wind turbine, wherein such an angle is defined as an angle between a rotating axis of a rotation shaft of the wind turbine and a current wind direction upstream of that wind turbine. The term "yaw offset" or "yaw offset setpoint" is used to refer to a control setting which should be met by the yaw misalignment angle when a control action is performed.

As further definitions, "positive yaw angles" will be used in the document for angles defining a clockwise diversion of the turbine rotor axis from the main wind direction as seen from above the turbine. "Negative yaw angles" will be used in the document for angles defining a counter-clockwise diversion of the turbine rotor axis from the main wind direction as seen from above the turbine. Absolute values of these positive and negative yaw angles increase when the rotor orientation departs further from an alignment of the turbine rotor axis and the main wind direction, wherein a perfect alignment of the turbine rotor axis and the main wind direction is represented by yaw angle of 0 degree. The method, which will later be discussed in this document however also allows for alternative definitions where counter-clockwise rotation is regarded positive yaw angle and clockwise rotation is regarded negative yaw angle.

Focusing particularly on yawing control, there may be situations in which an upstream turbine may have a specific yaw angle setting and a change of wind condition may result in a control action such that the yaw position is drastically changed, e.g., a repositioning from a higher value positive yaw angle to a higher value negative yaw angle. Even though this should result in an optimal orientation of the upstream wind turbine this also may trigger challenges as the repositioning of the rotor may take some time and wind conditions may change faster than the repositioning takes place. In a worst-case situation several of these major repositionings of the rotor yaw angle may happen in a fairly short time interval.

In general, it also has to be noted that all yawing actions create mechanical load or stress on components, like bearings, and a high yaw control activity could have a negative impact on these components in respect of their lifetime or service intervals.

There may be a need for an improved yaw control method ensuring reliable performance and at the same time reducing the number of unwanted yawing activities.

In patent application EP 3 037 657 A1 yawing is discussed to optimize wind farm operation. A wind farm with an upstream wind turbine and a downstream wind turbine is discussed, the upstream turbine being operated with, or according to, a current or present upstream operation parameter value under current wind conditions. Such operation parameter may be, among other examples, also the yaw angle. Also a so called "parameter change expense" is estimated in case the upstream operation parameter is modified.

According to patent application EP 2 767 710 A2 improving wind farm power production efficiency is discussed, also considering active wake steering. Among other details, it is discussed when an active yaw misalignment should be triggered. A delay is discussed to provide a smooth operation in case of intermittent wind shifts.

In publication "A data-driven, cooperative wind farm control to maximize the total power production" by Jinkyoo Park and Kincho H. Law, published via Elsevier, a wake model is discussed and effect of yaw offset angles on the wake. It is also shown that upstream wind turbined have a wake effect on downstream wind turbines.

SUMMARY

The following seeks to address these problems and mitigate related drawbacks.

An aspect relates to a method for controlling a first wind turbine of a plurality of wind turbines of a wind park, wherein a second wind turbine of the plurality of wind turbines can be affected by a wake region caused by the first wind turbine which is positioned upstream of the second wind turbine, wherein a rotor yaw offset angle set point for the first wind turbine is defined to follow a hysteresis characteristic. In consequence a switch from a range of positive yaw offset angles to negative yaw offset angles may be prevented if shortly before a switch from a range of negative yaw offset angles to positive yaw offset angles has just occurred, and the other way around.

According to embodiments of the invention the hysteresis characteristic is applied such that thereby immediate consecutive switching between a range of positive yaw offset angles and negative yaw offset angles is avoided, i.e., prohibited or prevented.

Zero offset angle would mean that the rotor is perfectly aligned into the main wind direction. "Positive" offset angles are understood as a yawing rotation of the rotor, starting from zero offset angle, in clockwise direction. "Negative" offset angles are understood as a yawing rotation of the rotor, starting from zero offset angle, in counter-clockwise direction. With "switching" a reyawing procedure is understood, in which a rotor executed a major repositioning in angles—for example a more than 10 degree change—and in which a rotor will be realigned either (a) starting in the region of positive angles and ending in the region of negative angles, or (b) starting in the region of negative angles and ending in the region of positive angles.

In consequence and in simple words, the rotor flips over to the other side.

"Immediate consecutive switching" would be some repositioning actions following fairly directly after another. So by avoiding such immediate consecutive switching, instantaneous switching back to angles with opposite sign is suppressed if such an switching action with change of sign was recently executed.

In more detail, embodiments of the invention are directed to a method for controlling a first wind turbine of a plurality of wind turbines of a wind park, wherein a second wind turbine of the plurality of wind turbines can be affected by a wake region caused by the first wind turbine which is positioned upstream of the second wind turbine, the method comprising the steps of:

(1) determining a current yaw state, wherein the current yaw state is selected from at least one of:
   a) an actual rotor yaw misalignment angle of the first wind turbine, wherein the actual rotor yaw misalignment angle is defined as an angle between a rotating axis of a rotor of the first wind turbine and a current wind direction at the first wind turbine,
   b) an identifier representing whether the actual rotor yaw misalignment angle is either in a range of positive yaw misalignment angles or alternatively of negative yaw misalignment angles;
(2) determining a wind condition indicative of a level of potential wake inducement at the second wind turbine caused at least by the first wind turbine, preferably the level of wake inducement is at least represented by a distance between locations of the first wind turbine and the second wind turbine and/or by the current wind direction at the first wind turbine;
(3) defining a rotor yaw offset angle set point for the first wind turbine based on the current yaw state, the wind condition, and at least one yaw angle hysteresis switching threshold, such that the rotor yaw offset angle set point follows a hysteresis.

The steps may preferably be executed in the order as defined above.

Thus, the current yaw state either the exact angle value of the current yaw position of the first wind turbine, i.e. the actual rotor yaw misalignment angle. In this configuration the determined current yaw state may represent the exact yaw position which is caused by a wind direction experienced during a previous yaw control cycle, assuming the control is performed in cycles.

Or the current yaw state is merely an identifier a binary identifier with two possible values—which defines whether the current yaw position is either in the range of positive yaw misalignment angles or alternatively in the range of negative yaw misalignment angles. Such an identifier may be sufficient to define the context of the control.

The current wind direction may be determined by a single measurement, e.g., using LIDAR (light detection and ranging). Alternatively, as it can be difficult to determine the current wind direction via a sensor attached to a wind turbine due to that the wind turbine itself may create turbulences, multiple measurement may be performed from which the wind direction may be inferred.

The current wind direction at a wind turbine may be a value that represents the wind direction at a height from ground of the rotor, as if that wind turbine would not be present. The current wind direction represents the wind direction shortly upstream of the wind turbine, as it will hit the rotor.

With "current" wind direction defines the presently occurring wind direction at a specific point in time.

The wind direction may be processed in sensors and/or the control unit as a vector or as a matrix to define an orientation of the wind. In the sense of this disclosure the wind direction may be defined as a direction from which wind is blowing but the method allows also to use a definition that the wind direction is a direction towards the wind is flowing, which is typically also referred to as wind vector.

The level of wake inducement may be represented by power loss on the downstream second wind turbine.

The level of wake inducement is an indicator how much the second wind turbine is impacted by the wake of the first turbine. Several values may be able to be used as level of wake inducement. One option for the level of wake inducement is to determine a distance between locations of the first wind turbine and the second wind turbine. By that it can be determined whether and how much the upstream first wind turbine affects the downstream second wind turbine, or whether the wake impact on the second wind turbine can be disregarded. In a variation of this option not only the distance between upstream and downstream wind turbines is evaluated but also a cross-stream distance may be considered to determine the level of wake inducement. There may be a wake overlap from different turbines caused by given downstream and cross-stream distances, wherein the wake overlap may be considered in the level of wake inducement. Further it has to be noted that the downstream and especially cross-stream distances change as the wind direction changes. Another option for the level of wake inducement may be to calculate a percentage of the rotor area which is affected by the wake compared to an overall rotor area. This would clearly indicate how strong the second wind turbine is affected by the wake. Yet another option would be that the level of wake inducement is represented by more than one physical value, e.g., by a pair of wind direction and the distance between locations of the first wind turbine and the second wind turbine.

In a preferred solution, a direct determination or measurement of the level of wake inducement during operation of the present control method may not be performed. The level of wake inducement may be considered in a configuration step using models that are used to define beforehand controller look-up tables that will later be used while the method is executed.

In case the present control method directly processes the level of wake inducement, for a given pair of wind turbines, which were selected based on the wind direction, the level of wake inducement may merely be represented by the distance between locations of the first wind turbine and the second wind turbine, as closely positioned wind turbines will affect another with a higher wake impact than more distant ones.

The rotor yaw offset angle set point for the first wind turbine represents the target value for the yaw position, which should be reached when a yaw control cycle is finished.

The term of the "at least one yaw angle hysteresis switching threshold" may be simplified in the following also as "the hysteresis threshold". If more than one yaw angle hysteresis switching threshold shall be discussed, then the term "the hysteresis thresholds", in plural, is used.

The hysteresis threshold—preferably a pair of two thresholds are defined for a given wind direction—defines a switching level of the hysteresis, i.e., of the hysteresis curve.

The hysteresis threshold may be a pre-defined value or may be calculated based on the current wind direction.

To control the rotor yaw offset angle set point according to a hysteresis the current yaw state, the wind condition, and at least one yaw angle hysteresis switching threshold will be evaluated. The wind direction may be one preferred parameter for the wind condition. As further options the rotor yaw offset angle set point may also be based on wind speed, wind turbulence and/or other conditions affecting the wake.

Some of the input parameters for the rotor yaw offset angle set point may also depend on the actual wind direction. This applies particularly for the selection of a relevant one of the at least one yaw angle hysteresis switching threshold.

Embodiments of the present invention consider an effect called wake deflection. The wake is a zone created by a wind turbine in which downstream wind speed is reduced caused by the extraction of kinetic energy from the wind. As the flow proceeds downstream, there is a spreading or dispersion of the wake and the wake eventually recovers towards free stream conditions. The wake of several upstream wind turbines may even be considered for operation of a single downstream turbine, which may again be considered to be upstream of further turbines in the wind park. According to embodiments of the invention particularly wake effects from neighboring wind turbines are considered. The term wake deflection refers to an effect in which a wake may not appear symmetrically behind an upstream wind turbine in case of a yaw misalignment of that wind turbine but is displaced or even curved in one direction. The yaw misalignment angle may have an impact on a level of displacement or curvature. That means that a downstream wind turbine that that is positioned directly behind an upstream wind turbine may only be affected partly by the wake induced by the upstream wind turbine if a yaw misalignment is used for the upstream turbine to create a wake deflection.

To use, in a wind park controller that uses yaw offset setpoints to mitigate wake effects on downstream turbines using wake deflection, the at least one yaw angle hysteresis switching threshold—defining a point at which a yaw angle is not only homogeneously increased but substantially reversed between positive and negative yaw angles—and to define the rotor yaw offset angle set point for the first wind turbine to follow the hysteresis is particularly advantageous as this prevents rapidly repeating transitions between positive and negative reference yaw angles which otherwise could occur. The yaw angle hysteresis switching threshold may define a trigger at which a transition between positive and negative yaw angles will be triggered for the rotor yaw offset angle set point but at the same time, as long as the yaw angle hysteresis switching threshold is not met or exceeded, the rotor yaw offset angle set point may be controlled to only execute minor angle adjustments, e.g., less than 5° or even less than 2° between the rotor yaw offset angle set point and the actual rotor yaw misalignment angle.

If this behavior is illustrated in a curve in which the y-axis represents the actual rotor yaw misalignment angle and the x-axis preferably represents the wind direction angle, the curve will be continuous until the yaw angle hysteresis switching threshold is reached by the current wind direction angle, at which a discontinuous inversion of the actual rotor yaw misalignment angle will take place, such that the curve is interrupted and jumps—as an example—from previous positive rotor yaw misalignment angles to negative ones. A second yaw angle hysteresis switching threshold may also be defined such that there will be a jump from previous negative rotor yaw misalignment angles to positive ones. Obviously in case of a pair yaw angle hysteresis switching thresholds, these should have different values to create the hysteresis effect.

In the previous example the yaw angle hysteresis switching threshold is defined by a threshold value for the wind direction angle, particularly the wind direction at the first wind turbine. Instead, the yaw angle hysteresis switching threshold could also be based on another parameter, preferably as long as the other parameter reflects the wind direction and/or the distance to an upstream wind turbine that creates a wake.

Thus, the hysteresis threshold may be a pre-configured value or may be determined in a method step based on input parameters, particularly wind directions and/or distance between wind turbines. The hysteresis threshold may also be determined based on the level of wake inducement. By this, the hysteresis threshold defines a value at which the level of wake inducement is increased above acceptable limits.

In one solution the plurality of at least one yaw angle hysteresis switching threshold may be pre-configured, determined by setting these values to a preconfigured acceptable level of wake inducement for each wind direction range to consider. The acceptable level of wake inducement defines a range in which an inversion of yawing position would not be required as the level of wake inducement would still be in a suitable range.

An optimization may be performed in advance. By applying the acceptable level of wake inducement in an optimization using wind turbine wake models, the hysteresis thresholds can be calculated for each turbine in the wind farm for each wind direction range to consider and can be integrated into yaw offset lookup tables.

In case of a wind park a specific wind turbine may have several neighboring wind turbines having an influence on the specific wind turbine. In this case there may be several wind direction ranges at which a hysteresis characteristic could have an advantage as explained before. In such a situation it would be preferred to have several yaw angle hysteresis switching thresholds, preferably for each downstream wind turbine that can possibly be affected by a wake effect of a given upstream wind turbine, a pair of yaw angle hysteresis switching thresholds should be defined for that given upstream wind turbine.

The explained method defined as a basis an upstream first wind turbine and a downstream second wind turbine. With a change of wind direction different pairs of wind turbines may affect another by wake, so different pairs of wind turbines may be selected for the method.

In one option of embodiments of the invention the at least one yaw angle hysteresis switching threshold may be determined—preferably selected from pre-configured set of values—based on the current wind condition, particularly a current wind direction, or on the level of wake inducement at the second wind turbine caused at least by the first wind turbine. Furthermore the at least one yaw angle hysteresis switching threshold may be determined based on an angular distance value, wherein preferably the angular distance value corresponds to a lag for the at least one yaw angle hysteresis switching threshold lagging behind a local optimum for possible yaw angle values for the first wind turbine.

In other words, there may exist an optimal switching value for a yaw angle, at which it may be advantageous to inverse the orientation of the yaw angle, as by this behaviour the level of wake inducement may not exceed a given value. This optimal switching value is a local optimum for the rotor yaw offset angle set point. According to an embodiment of the invention this local optimum is not used to trigger an inversion of the orientation of the yaw angle but there will be a lag or delay such that only further angular change will trigger this inversion. So, this "lag" is an angular delta value—an angular lag—but may result in consequence in a time lag until the inversion of the orientation of the yaw angle will be triggered. By this behaviour a hysteresis characteristic can be followed for the rotor yaw offset angle set point.

In an embodiment of the invention the wind condition may be an input parameter to one or several of the previously discussed parameters. For example, the determining of the level of wake inducement at the second wind turbine may be based on a current wind condition. Alternatively, or additionally the defining of a rotor yaw offset angle set point for the first wind turbine may also be based on the current wind condition. Also, the hysteresis threshold may be based on the current wind condition. One main wind condition is the current wind direction which is present at a given point in time. So as an example, the level of wake inducement may be preferably a function of the present wind direction.

In more detail, the current wind condition may be represented by at least one of the following parameters: As already said, it may be represented by a current wind direction, preferably determined at or for the location of the first wind turbine. Second, it may be represented by a current wind speed, preferably determined at or for the location of the first wind turbine, at or for the location of the second wind turbine or any other representative position. Third, it may be represented by a current wind turbulence, preferably determined at or for the location of the second wind turbine. Finally, it may be represented by a current wake deflection as a misalignment of the wake compared to a wake induced by the first wind turbine with a yaw misalignment angle of zero, preferably determined at or for the location of the second wind turbine or in a region between the first wind turbine and the second wind turbine.

In the previous explanation with "for a location" it should be understood that a direct measurement "at" a specific location may not be possible, but a wind condition can at least be derived "for" a specific location based on measurements at one or several locations or derived from other measurements which correspond to the to be determined wind condition.

The wind condition may also be a mean value, e.g., an average wind speed for a given—fairly short—time span that was occurring prior to the present moment in time or a mean value for the wind direction may be calculated over such a time span.

In the following the control of the rotor yaw offset angle set point is discussed along some embodiments, also to explain the implications of the yaw angle hysteresis switching threshold or "hysteresis threshold" in short.

In a first embodiment the step of defining a rotor yaw offset angle set point may be performed such that the yaw angle hysteresis switching threshold defines a switching limit of the hysteresis for the rotor yaw offset angle set point. The switching limit may be a specific wind direction angle value and the control method may be performed such that the rotor yaw offset angle set point will be changed between positive and negative angles once this switching limit is reached or exceeded by the present wind direction angle value. Thus, in consequence the yaw position will drastically change, and the yaw motors will be triggered to re-position the rotor according to the new rotor yaw offset angle set point.

In another embodiment the step of defining a rotor yaw offset angle set point may be performed such that for rotor yaw offset angle set points or for wind directions in a range between two of the yaw angle hysteresis switching thresholds an increased level of wake inducement will not trigger switching between a positive and a negative rotor yaw offset angle set point. This allows to select two hysteresis thresholds in a way that a switch between positive and negative yaw angles will only take place if the wind direction has changed substantially, while a minor reverse change of a wind direction will not directly trigger another switch between positive and negative yaw angles. This should reduce the number of major repositionings and only if the wind direction changes considerably, another switch between positive and negative yaw angles will be initiated.

Explaining the behaviour according to a hysteresis further, the step of defining the rotor yaw offset angle set point may comprise sub steps of switching an actual rotor yaw misalignment angle with a positive angle to a negative angle if a first one of the at least one yaw angle hysteresis switching threshold is reached or exceeded, and switching an actual rotor yaw misalignment angle with negative angle to a positive angle if a second one of the at least one yaw angle hysteresis switching threshold is reached or exceeded.

As already mentioned, the at least one yaw angle hysteresis switching threshold may define at least a first hysteresis limit for the rotor yaw offset angle set point or the wind direction such that the rotor yaw offset angle set point (a) is limited to an incremental angle difference in case the rotor yaw offset angle set point or the wind direction is below the first hysteresis limit and (b) is switched between positive and negative angle thereby reversing a rotor yaw misalignment angle in case the rotor yaw offset angle set point or the wind direction reaches or would exceed the first hysteresis limit. The term "below" a limit can mean that a value (including considering its algebraic sign) may be below a limit or that only absolute values are compared. That means an angle of $-10°$ may still be considered to be below a limit of $-15°$ (even though, when considering the signs, $-10°$ would be greater than $-15°$).

If the first hysteresis limit may define a switch from positive to negative angles, then a second hysteresis limit can be defined for the opposite behaviour to switch from negative to positive angles.

In a preferred embodiment the hysteresis threshold may be defined as a plurality of pairs of yaw angle hysteresis switching thresholds, wherein each pair is selected for a specific wind condition or a specific range of wind conditions. As an example, the first wind turbine can create wake in all kinds of directions but may affect a number of X different other downstream turbines (as an example X may be 3). So, any one of the X downstream turbines can be considered to be downstream the "second wind turbine" as introduced before. Depending on the actual wind direction, it may be advantageous to apply the discussed hysteresis behaviour for X ranges of wind directions so that all X downstream turbines can be protected from wake inducement while also preventing rapid switching between positive and negative yaw angles on the first turbine. In consequence X pairs of hysteresis thresholds could be defined. To illustrate this further, for three downstream wind turbines, at wind directions 15°, 60°, and 150°, e.g., relative to the North, there could be the optimum switching level if no hysteresis would be used. Now the hysteresis limits could be for example defined with a width of 6°, so the hysteresis characteristic could be defined as pairs of angles of [12°, 18° ], and [57°,63° ], and [147°, 153° ] defining three regions of hysteresis for three specific wind direction ranges. That means, for a continuously clockwise turning wind direction, a switch between positive and negative angles may occur at 18°, 63° and 153°. For a continuously counter-clockwise turning wind direction, a switch between negative and positive angles may occur at 147°, 57° and 12°.

The previously explained method only derives the rotor yaw offset angle set point. In consequence it may be the goal to use this set point for a yawing action, i.e., preferably a further method step may be defined as to activate a yaw actuator, preferably a step motor, of the first wind turbine for yawing the first wind turbine until the rotor yaw offset angle set point is reached.

Previously the method was explained for a given set of an upstream first and a downstream second wind turbine. Nevertheless, in a wind park generally all turbines can be, at a given wind situation, be upstream or downstream of another wind turbine. In an embodiment, the method is enhanced, such that prior to all of the previously defined method steps, the method may further comprise the steps of (i) determining, based on the current wind condition, in particular a current wind direction, a pair of wind turbines of the wind park wherein a downstream wind turbine of the pair of wind turbines is or can be affected by a wake region caused by an upstream wind turbine of the pair of wind turbines, (ii) selecting the upstream wind turbine of the pair of wind turbines as the first wind turbine, and (iii) selecting the downstream wind turbine of the pair of wind turbines as the second wind turbine.

In a further embodiment the distance between locations of the first wind turbine and the second wind turbine may be calculated based on positioning coordinates of the first and second wind turbine. Typically, the coordinates of all wind turbines of the wind park may be configured and stored in a database or a lookup table. The distances and alignment angles between neighbouring wind turbines may also be stored in a database or a lookup table.

In a further embodiment the step of defining the rotor yaw offset angle set point for the first wind turbine may be performed by at least accessing a pre-configured look-up-table, wherein accessing the look-up-table returns the rotor yaw offset angle set point. As an example, the look-up table for a determined pair of wind turbines may be a function of at least the wind direction and returns the rotor yaw offset angle set point. Further input parameters may be wind speed, wind turbulence, or other parameters. Even though the term "function" is used, the look-up-table may not be a mathematical function but a matrix.

Embodiments of the invention are further directed to a wind park controller performing the above-mentioned method steps.

Furthermore, embodiments of the invention are also directed to a wind park comprising a plurality of wind turbines and such a wind park controller.

For all the above-mentioned solutions, it is advantageous that a wake can be steered, a number of major re-yawing actions between positive and negative yaw angles can be reduced. In consequence this reduces the wear tear of the yaw actuation mechanism.

Such wake steering can be defined as a controlling of deflecting the wake to reduce wake impact on downstream turbines. As a further advantage the mentioned wake steering may allow increased power production of the wind park by reducing wake losses, i.e. reduction of power experienced by downstream wind turbines due to wake of upstream turbine(s).

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

Furthermore, examples have been and will be disclosed in the following sections by reference to wind turbine blades. Embodiments of the invention are also applicable for any type of wind turbine module, e.g., tower or hub. Furthermore, the general concept can be applied to rotating parts as well as stationary parts when the wind turbine is operating after the servicing or installation work has ended.

The aspects defined above and further aspects of embodiments of the present invention are apparent from the examples of embodiment to be described hereinafter and are explained with reference to the examples of embodiment.

BRIEF DESCRIPTION

Some of the embodiments will be described in detail, with reference to the following figures, wherein like designations denote like members, wherein.

DETAILED DESCRIPTION

Figure 1:
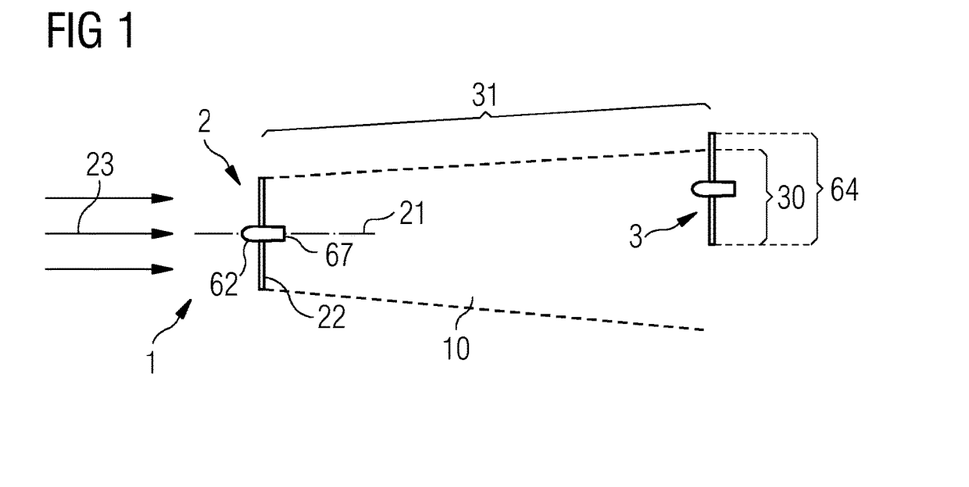
FIG. 1, shows schematically a wake created by a wind turbine rotor as seen from the above.

In FIG. 1 schematically a wake created by a wind turbine rotor is shown, as seen from the above. That means the direction of view is defined as seen from the air above the wind turbines onto a ground or a water surface on or above which a wind turbine is erected. This is also true for the further FIG. 2-6.

In FIG. 1 and also the further figures a wind park 1 is abstractly shown, at least with a first wind turbine 2 and a second turbine 3. The wind park generally comprises further wind turbines which are not shown in FIG. 1.

The first wind turbine 2 is shown quite abstractly with a rotor 22 depicted just as a straight line from top defining an area 64 which is traversed or covered by rotor blades when in rotation. Further element of the abstract depiction of the wind turbine is a hub 62 and a nacelle 67. The hub 62 and the nacelle 67 rest on a tower not shown in FIG. 1 and are oriented into the wind that during operation the hub 62 is directed into the wind and the nacelle 67 is downstream in respect of a current wind direction 23 and as seen in relation to the rotor 22. The current wind direction 23 is the wind direction at a specific point in time at which a control method is performed and is identified by arrows, at least when discussed for a wind turbine which is affected by a substantially homogeneous wind. Please note that in the figure the arrow indicates the direction in which the wind is blowing (i.e., the wind vector), but meteorologically a "wind direction" may be represented by the direction from where the wind is coming. For the principle of embodiments of the invention there are no substantial difference in the control whether the wind direction is taken as a vector in which the wind is flowing or from where the wind is flowing.

A rotating axis 21 of the wind turbine(s) is identified by a broken line. The rotating axis 21 is perpendicular to the orientation of the rotor 22, i.e., the orientation of the rotor blades.

In FIG. 1 the first wind turbine 2 is considered upstream of the second wind turbine 3 for the shown wind direction 23 from left to right. A distance 31 between locations of the first wind turbine 2 and the second wind turbine 3 can be determined as the shortest distance between towers of the pair of wind turbines.

The upstream first wind turbine 2 may create a wake, which is identified as wake region 10. The wake region 10 is a region of increased turbulence and is a region downstream of the first wind turbine 2. The wake region 10 may be approximately symmetric to the rotational axis 21 if the rotational axis 21 is aligned to the wind direction 23. The wake region 10 expands along the distance 31 but may also lose its negative impact so that at some distance the wake can be considered to have disappeared and that the wind direction 23 and a wind speed is again approximately uniform. Contrary to that the downstream second wind turbine 3 is considered to be located in the wake region 10 of the upstream first wind turbine 1. The impact of the wake is identified by reference numeral 30, which refers to a part of the area 64—area 64 identifies the overall area which is covered by the rotating blades—which is affected by the wake. Element with reference numeral 30 can be considered to be a level of wake inducement 30, at it represents the impact of the wake on the downstream second wind turbine 3.

So far FIG. 1 shows only the known effect of wake impact within a wind park 1 with a plurality of wind turbines, when focusing on a subset of two wind turbines.

Figure 2:
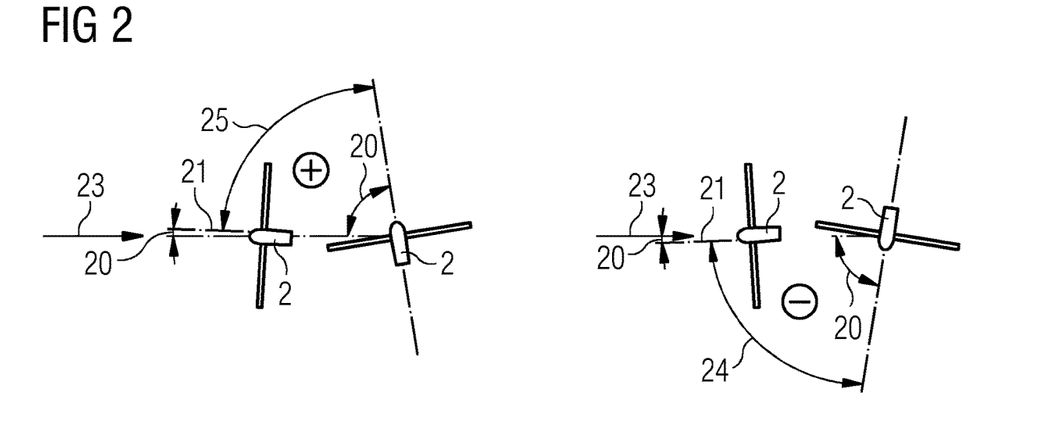
FIG. 2 illustrates ranges of positive and negative yaw angles.

Along FIG. 2 some further terminology is introduced. The two drawings of FIG. 2 represent show yawing of the first wind turbine 2. An actual rotor yaw misalignment angle 20 is identified as an angle between the rotating axis 21 of the first wind turbine 2 and the wind direction 23 which is directed onto the first wind turbine 2. The first drawing of FIG. 2 represents a range of positive yaw misalignment angles 25. Such positive angles 25 are all angles that show a clockwise misalignment of the wind turbine as seen from above in respect of the incoming wind direction 23. So positive values for the yaw misalignment angles 25 are between 0° and +90°. The second drawing of FIG. 2 represents a range of negative yaw misalignment angles 24. Such negative angles 24 are all angles that show a counter-clockwise misalignment of the wind turbine as seen from above. So negative values for the yaw misalignment angles 25 are between 0° and −90°.

Based on this definition the current yaw misalignment of a current situation can be represented just by two states, the current yaw states, either the present yaw misalignment is in the range of positive yaw misalignment (shown in the figure by a "+" identifier) or the present yaw misalignment is in the range of negative yaw misalignment (shown in the figure by a "−" identifier).

According to embodiments of the invention it is important to determine the current yaw state, i.e., in which region of angles a yaw position of a wind turbine is currently located. This is one of the information that is used to determine the next rotor yaw offset angle set point, which is explained now in reference to the FIGS. 3 to 5.

Figure 3:
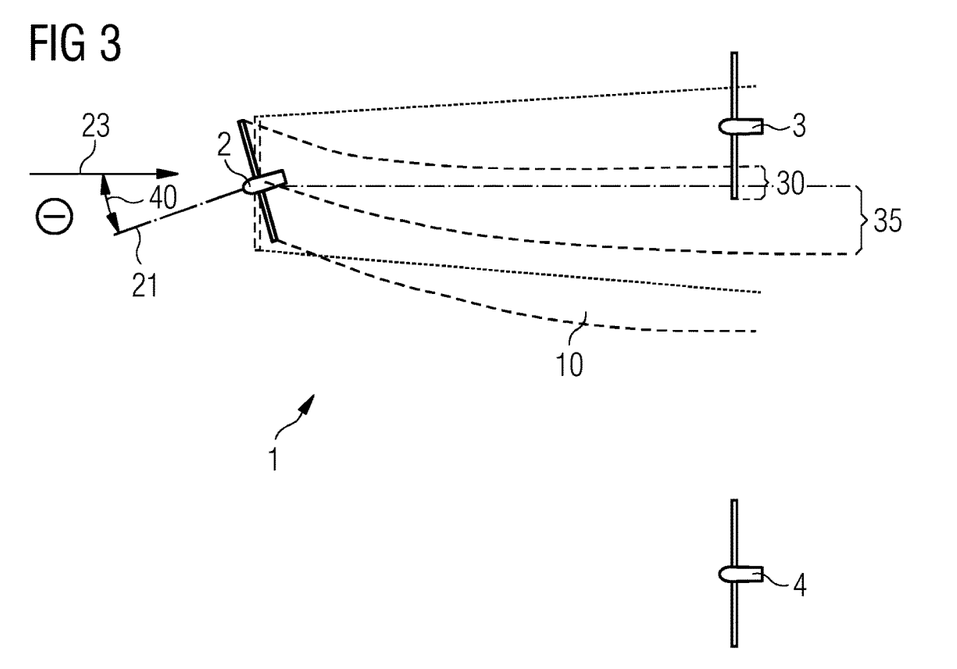
FIG. 3 illustrates wake deflection induced by an upstream wind turbine using a yaw offset for a given wind direction.

FIG. 3 illustrates wake deflection induced by an upstream first wind turbine 2 for the given wind direction 23. As shown by dashed lines, the first wind turbine 2 could be perfectly directed into the wind, i.e., the rotating axis 21 could be in parallel to the wind direction 23. The shown angle 40 would then be zero. In consequence, possibly exaggerated in the drawing, a wake would occur that would have a major impact onto the rotor of the downstream second wind turbine 3. So for the depicted wind direction 23 the second wind turbine 3 would be clearly affected by the wake of the upstream first wind turbine 2. As one important element of the control method according to embodiments of the invention, this wake impact can be reduced if the first wind turbine 2 is put in a yaw position in the range of negative angles. Thus, a rotor yaw offset angle set point 40 is defined which indicates to the target position for the yawing of the first wind turbine 2. If now a yaw actuator is triggered and the present yaw misalignment angle will be positioned according to the rotor yaw offset angle set point 40, the created wake changes its shape which is called wake deflection 35. The upstream turbine deflects the wake in this case to the right when seen from above so that the wake overlap with the rotor area of the downstream turbine is reduced. In the exemplary figure only a small region of the wake is affecting the rotor area. This reduces wake-induced loads on the downstream second turbine 3 and allows improved power production compared to an un-yawed upstream turbine.

So it is one element of the control method to set a rotor yaw offset angle set point 40 so that based on the wind direction 23 as a current wind condition the level of wake inducement 30 at the second wind turbine 3 is optimised. For the shown scenario the yaw misalignment angle 40 is in the range of negative rotor yaw angles.

In FIG. 3 also a further wind turbine 4 is shown, which is not affected by the first wind turbine 2 or the second wind turbine 3. Assuming that the further wind turbine 4 is also not in the wake of another wind turbine of the wind park 1, it is aligned into the wind with a yaw angle of 0°.

Figure 4:
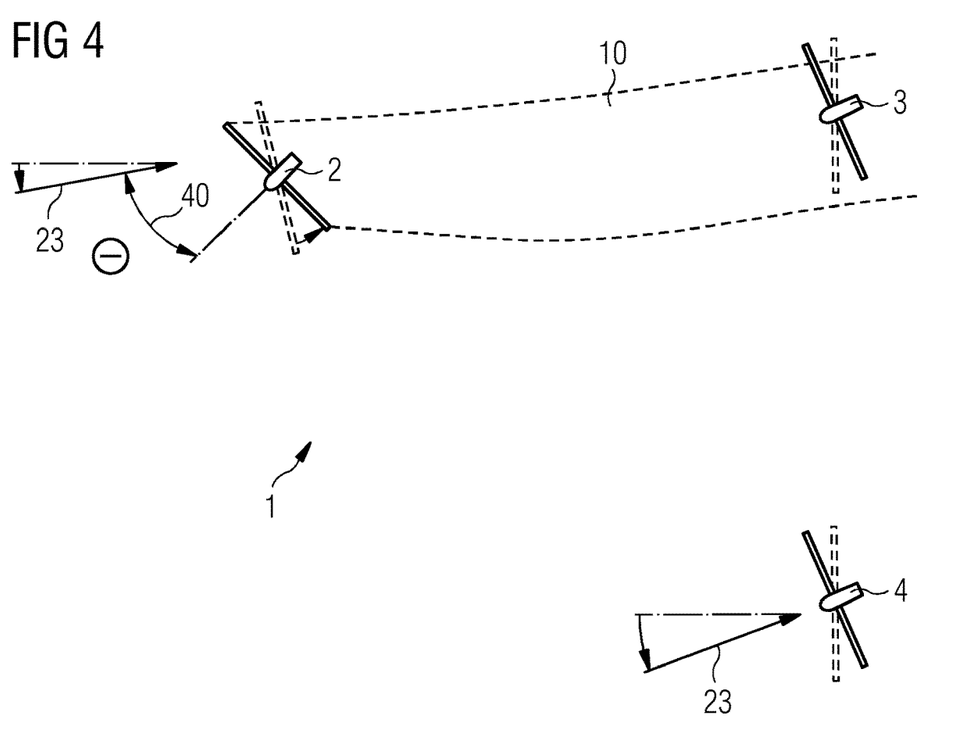
FIG. 4 illustrates the behaviour of control method according to embodiments of the invention and the created wake when the wind direction changes.
Figure 5:
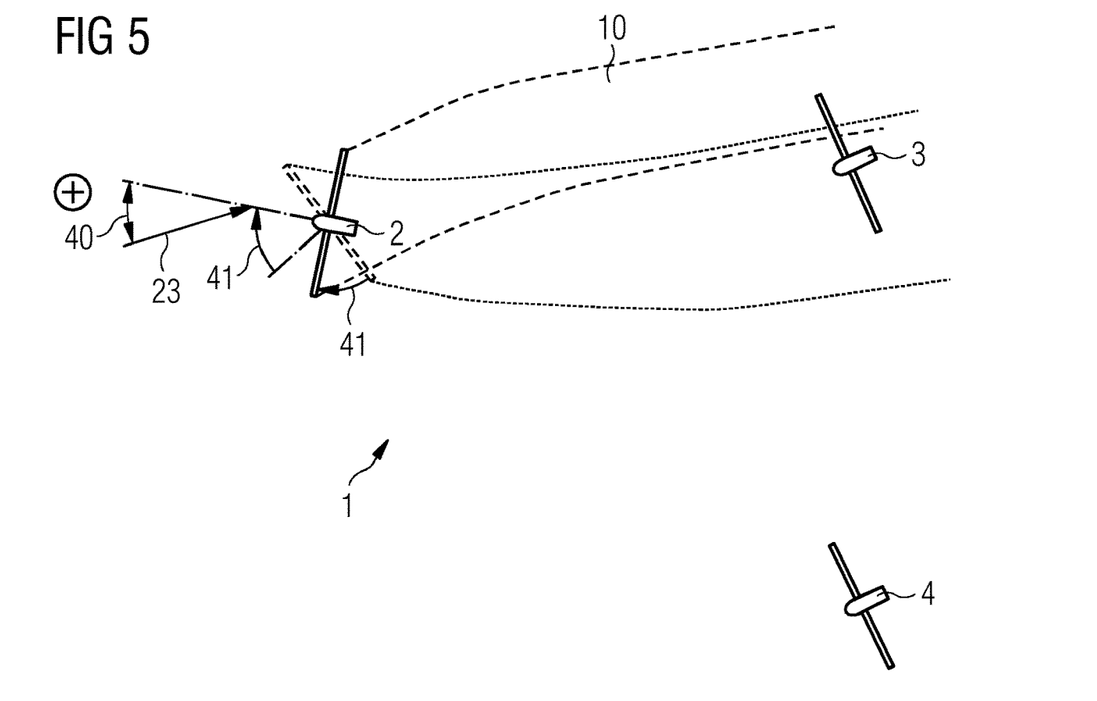
FIG. 5 illustrates the behaviour of control method according to embodiments of the invention and the created wake when the wind direction continues to change.

The inventive control method is now further explained in accordance with FIGS. 4 and 5. FIG. 4 illustrates the behaviour of control method according to embodiments of the invention and the created wake when the wind direction changes. The situation of FIG. 4 is a situation that can occur some time after the previous position as shown in FIG. 3. The previous wind direction and the previous yaw position from FIG. 3 are shown as dashed lined in FIG. 4.

According to FIG. 4 the current direction 23 changes in a way, that the wake region 10 of the first wind turbine 2 would again more strongly affect the downstream second wind turbine 3. Every time the wind condition changes, in a next control cycle the absolute yaw position of the rotor will also turn in the same direction. The relative yaw misalignment angle, relative to the wind direction 23 may not necessarily change, though. Due to the turning wind, incremental changes of the rotor position may result in a negative impact on the level of wake inducement, which can be seen in FIG. 4 as the wake region 10 covers most of the rotor blade area.

For the shown scenario according to FIG. 4 the yaw misalignment angle 40 continues to be in the range of negative rotor yaw angles.

The second wind turbine 3 may also realign in orientation due to the change of the main wind direction (as shown in FIG. 4). For the depicted situation in FIG. 4 this does not result in a strong improvement of the level of wake inducement.

The further wind turbine 4 may simply change orientation based on the new wind direction 23 at the location of the further wind turbine 4.

According to the transition from FIG. 3 to FIG. 4 one further element of an inventive control method can be seen. The rotor yaw offset angle set point 40 will be changed incrementally—e.g., by changing the orientation in steps of 1°—as long as a specific upper limit is reached, i.e. if a yaw angle hysteresis switching threshold (or simply "hysteresis threshold") is reached or exceeded.

FIG. 5 now illustrates the behaviour of the control method according to embodiments of the invention when such a hysteresis threshold is reached. FIG. 5 further illustrates the created wake when the wind direction continues to change, wherein FIG. 4 is the starting situation.

According to embodiments of the invention the rotor yaw offset angle set point 40 for the first wind turbine 2 follows a hysteresis. The setting of the rotor yaw offset angle set point 40 is based on the current yaw state, the wind condition, and at least one yaw angle hysteresis switching threshold. The level of wake inducement 30 may have been used to pre-define proper yaw angle hysteresis switching thresholds. The current yaw state in FIG. 4 was in the range of negative angles. The level of wake inducement 30 was at a high level, e.g., 70% of the rotor area was affected by the wake region 10. In such a situation the yaw angle hysteresis switching threshold may be reached which triggers a specific procedure. Instead of further incremental changes of the rotor yaw offset angle set point 40, substantial reposition action 41 takes place in which a switch from negative yaw angles to positive yaw angles take place. Purely as an example the absolute value of the current yaw misalignment angle is taken, the algebraic sign is changed the new value with changed algebraic sign will be taken as a new rotor yaw offset angle set point 40.

While it is an important element of the control method that a change between positive and negative yaw angles is performed—i.e., between positive yaw state and negative yaw state—it is not a requirement that the absolute angle stay the same. It may well be that a switch from −20° to +15° can happen, so that the absolute values (in the example 20° and 15°) are not identical.

By reaching the hysteresis threshold and by repositioning the rotor of the first wind turbine 2 by changing the yaw state from negative to positive angles, the previous wake region is also flipped over creating a wake deflection with opposite orientation, as shown in FIG. 5. In consequence the rotor area is only partly affected by the wake region 10.

The explained definition of the rotor yaw offset angle set point 40 will be executed in one control cycle. In the control method control cycles will be consecutively executed for a continuous execution of the control.

If then in next control cycles the wind direction continues to change in the same direction as before, then incremental changes will be performed again, as the hysteresis threshold is already passed, as long as a next hysteresis threshold would not be met.

If then in next control cycles the wind direction continues to change in opposite direction as before, then it is part of the inventive control method that now the hysteresis takes is effect and the orientation of the rotor will not directly flip back again. Reorientation will now be performed with incremental changes as long a second hysteresis threshold is not reached. Details of the reverse operation is not shown in FIG. 5 but will later be explained in accordance with FIG. 6.

So far, the pair of wind turbines 2 and 3 had an impact to another. If the wind direction may change more drastically (e.g., the wind from the left in the figure will change to a wind from the top) it can happen, that the wake of the wind turbine 2 has no impact anymore to the wind turbine 3. But on the other hand, the wind turbine 3 may have an impact to the further wind turbine 4. This is illustrated in FIG. 6.

Thus, the wind turbine 3 can be considered to be now the upstream wind turbine and the wind turbine 4 can be considered to be the downstream wind turbine. Then the same logic as before can be applied, so the upstream wind turbine will need to perform the previously explained control logic for the first wind turbine (previously identified as "2") and is therefore identified as upstream wind turbine 2'. The downstream wind turbine takes now the position of the second wind turbine (previously identified as "3") and is therefore identified as downstream wind turbine 3'.

Figure 6:
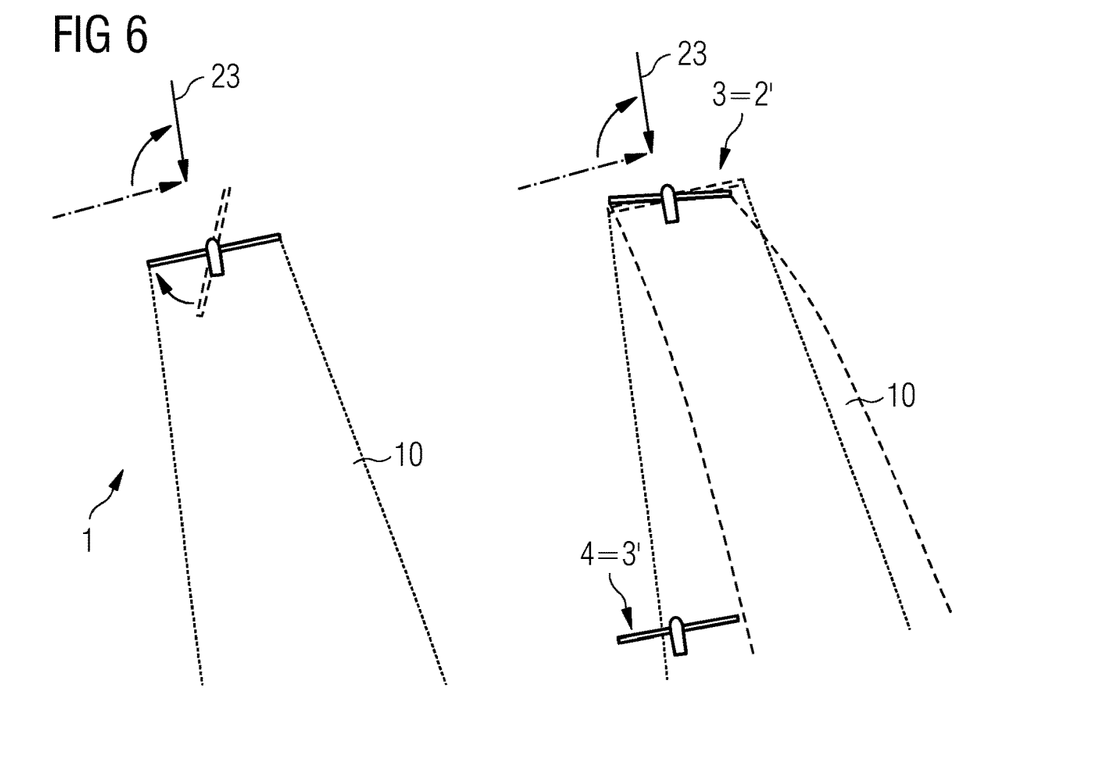
FIG. 6 shows schematically how to identify pairs of wind turbines that cause a wake effect on another.

Now again the control will be performed to take benefit from wake deflection in the example as shown in FIG. 6 a positive yaw misalignment angle is applied to divert the wake region 10 from the rotor blade area of the downstream wind turbine 3'.

Thus, it may also be an element of the control method, to identify the turbines that can affect another. The relevant set of turbines can be derived from the distance to another, the orientation to another, and the present wind direction. Based on that the pair of turbines can be selected for which the upstream turbine may be triggered to yaw to gain a wake deflection.

If it is considered that the wind direction 23 could change further in clockwise direction there may happen again a situation at which the level of wake inducement—this time by the wind turbine 2' onto the wind turbine 3'—may be exceeding unwanted levels. Again, a hysteresis threshold may be hit and a reyawing may be triggered to switch between positive and negative angles.

Figure 7:
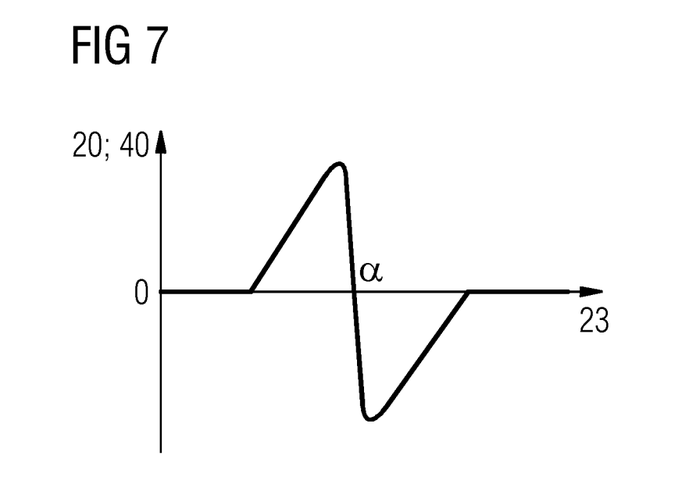
FIG. 7 shows a graph of a conventional art behaviour of yaw angle control.

FIG. 7 shows a graph of a conventional art behaviour of yaw angle control in which no hysteresis is implemented.

This is not directed to embodiments of the invention but shall be the basis for the explanation of the inventive control.

The graph shows on the x-axis the wind direction 23, i.e., the inflow wind direction angle taken at the upstream wind turbine 2 or 2'. The y-axis shows the rotor yaw offset angle set point 40, and as this is met by the actual setting after the yaw actuating is performed, the y-axis also represents the actual rotor yaw misalignment angle 20.

In the example, from left to right, a turning wind direction will at some point trigger a yawing to initiate wake deflection. In the example first a positive offset is triggered and in course of a further turning wind direction the offset increases incrementally. If the wind direction continues to change in the same direction there is the need to switch the orientation of the rotor. The point a may be a switchover angle, at which the new orientation of the yaw state takes place. This continuing the curve from left to right, the negative yaw angles will be set and once a fairly large negative offset is configured, further increasing angles will result in incrementally reducing yaw offset.

In this curve it is problematic if the wind direction is in the region of a but the wind direction changes several times clockwise and counter-clockwise passing several times the value of a. In such a situation the wake deflection is repeatedly inversed, which results every time a major re-yawing action. This would result in high mechanical effort and resulting in wear. Secondly, yawing is typically a substantially slow action as a heavy load must be rotated. Thus, triggered yaw actions according to the shown graph may not even able to track fast wind changes so that the upstream wind turbine may frequently reposition itself and may not be in a preferred angle at all times, which results in non-optimal wake deflection.

Figure 8:
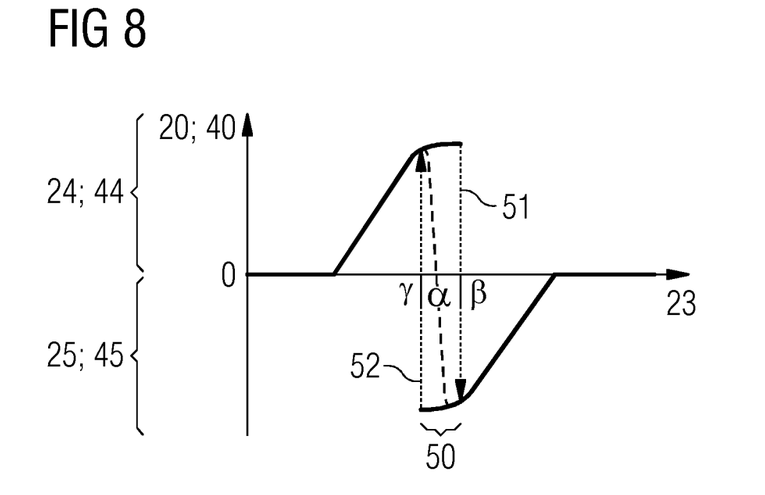
FIG. 8 shows an exemplary graph of a behaviour of yaw angle control according to embodiments of the invention.

FIG. 8 shows now an exemplary graph of a behaviour of yaw angle control according to embodiments of the invention. The x-axis and y-axis are the same as in FIG. 7.

The procedure according to FIG. 8 differs from FIG. 7 that a switchover may not happen at the "perfect" angle a but the yaw angle may continue to perform incremental changes or even no changes at all, until a first hysteresis threshold with a first switching limit 51 is reached, identified in the curve as angle b. Then a switchover from positive to negative yaw angles take place, jumping on the graph from the positive rotor yaw offset angle set points 44 to the negative rotor yaw offset angle set points 45. Once the second branch of the graph is met, the curve can be followed with incremental changes in both directions. Further increased wind direction rotation in the same direction as before would continue the curve to the right and the negative rotor yaw offset angle set points 45 would decrease in its absolute value.

But if the wind direction rotation is reversed in opposite direction the second branch of the curve of will be followed to the left, and here incremental angle changes are allowed until a second hysteresis threshold with a second switching limit 52 is reached, identified in the curve as angle g. If angle g is met, there will be again a switch back to positive yaw angles onto the previously discussed branch of the graph, so that the new position again allows wind direction changes without immediately triggering a further switch back to negative yaw angles.

In consequence a hysteresis 50 is formed, so that a switchover between positive and negative yaw angles will only occur if a substantial wind direction change occurs.

As an example, the distance between angles b and g may be 2.5°, 5° or 10°. This may be dependent on the location of the wind park and how frequently the wind direction changes at the given location.

The graph shows on the y-axis shows the rotor yaw offset angle set point 40 and positive values represent positive rotor yaw offset angle set points 44 and negative values represent negative rotor yaw offset angle set points 45, Nevertheless, as the actuator will follow the set point setting so that eventually the actual setting is identical to the set point setting, the graph can be understood to also show on the y-axis the actual rotor yaw misalignment angle 20 and positive values represent positive actual rotor yaw misalignment angles 24 and negative values represent negative actual rotor yaw misalignment angles 25.

Reviewing FIG. 8 and FIGS. 3 to 5 together, the states in FIGS. 3 and 4 represent a transition on the negative angle branch of the curve from right to left with increasing absolute angles. FIG. 5 represents that the hysteresis threshold g is reached so that a switchover to positive yaw angles occurs. The new orientation according to FIG. 5 is represented by the point on the positive branch of FIG. 8, to which the arrow of switching limit 52 points.

The value a in theory defines the optimal transition point and is positioned between the two switching limits b and g.

Having introduced now all elements of the control method these should be reviewed altogether for one control cycle. First, based on the wind direction and on the distance to another, a pair of wind turbines is selected as a first wind turbine 2 or 2' that could have an implication on a second turbine 3 or 3'. Then a current yaw state is determined. In an embodiment, the current yaw state is simply a binary identifier representing whether the actual rotor yaw misalignment angle 20 is either in a range of positive yaw misalignment angles 24 or alternatively of negative yaw misalignment angles 25. So, by that the branch on the curve of FIG. 8 is selected. Alternatively, the current yaw state can also be identical to the actual rotor yaw misalignment angle 20 of the first wind turbine 2 or 2'.

According to the explained procedure the control reflects a level of wake inducement 30 at the second wind turbine 3 or 3' caused at least by the first wind turbine 2 or 2'. The level of wake inducement may be a percentage of how much of the rotor area will be negatively affected by the wake. The level of wake inducement 30 may also correspond to the distance 31 between locations of the first wind turbine 2 or 2' and the second wind turbine 3 or 3' and/or to the wind direction 23.

Finally, the rotor yaw offset angle set point 40 for the first wind turbine 2 or 2' is defined to follow a hysteresis 50. This is based on the current yaw state, the wind condition—particularly the wind direction—, and the yaw angle hysteresis switching thresholds 51 and 52. Implicitly the rotor yaw offset angle set point 40 is also controlled based on the level of wake inducement 30. The yaw angle hysteresis switching thresholds 51 and 52 may itself depend on the level of wake inducement 30 as they define trigger points to reduce the current level of wake inducement.

With the defined rotor yaw offset angle set point 40 a yaw actuator can be triggered to set the actual rotor yaw misalignment angle 20 to the target value of the rotor yaw offset angle set point 40. By this the control cycle would end and at a further point in time a next control cycle will be initiated according the same procedural steps.

Figure 9:
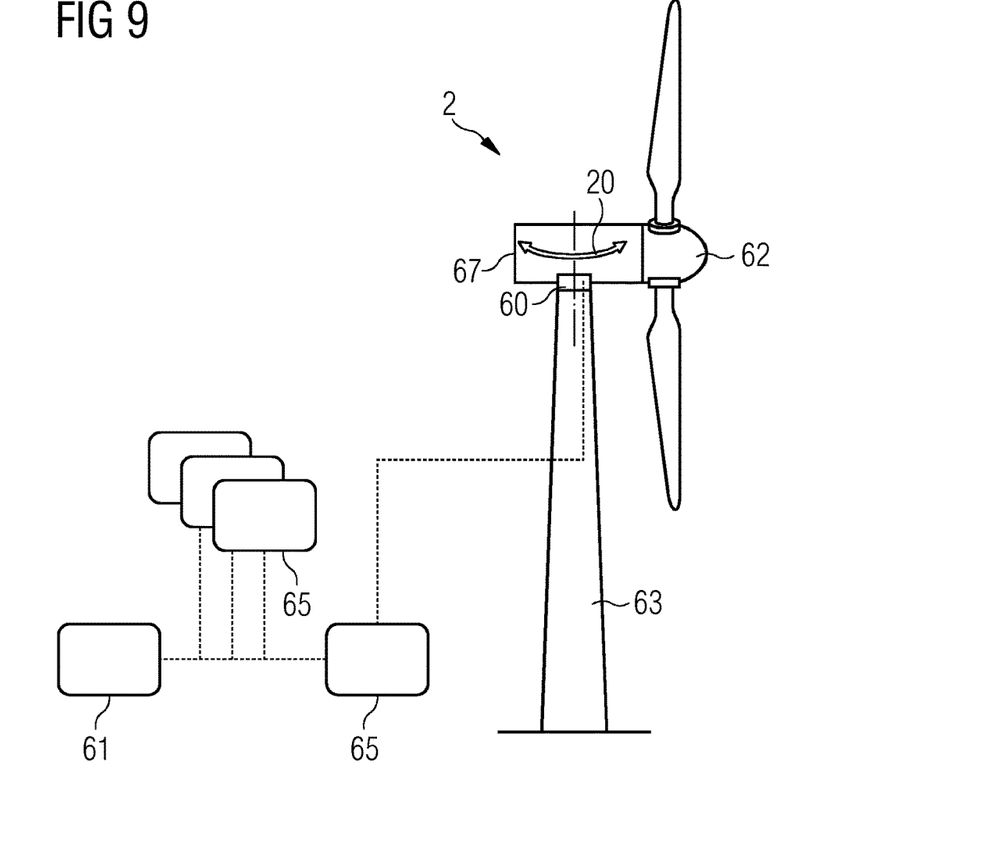
FIG. 9 illustrates the wind park control topology.

FIG. 9 now illustrates the wind park control topology. This time the wind turbine 2 is shown from the side, showing the hub 62 and the nacelle 67 on top of a tower 63. A yaw actuator 60 is abstractly shown between the nacelle 67 and the tower 63, allowing yawing about a vertical axis of the wind turbine. So, an actual rotor yaw misalignment angle 20 can be configured.

A wind turbine controller 65 may be present for each wind turbine in the wind park. The wind turbine controller 65 again will be in communication with a wind park controller 61.

The wind park controller 61 performs the previously discussed control method, particularly that pairs of turbines are selected, a current yaw state for an upstream turbine is determined, that a level of wake inducement is determined and that a rotor yaw offset angle set point is defined under consideration of a at least one yaw angle hysteresis switching threshold. The determined rotor yaw offset angle set point can then be transmitted from the wind park controller 61 to the wind turbine controller 65, which in turn will trigger the yaw actuator 60 to perform the yawing action.

Figure 10:
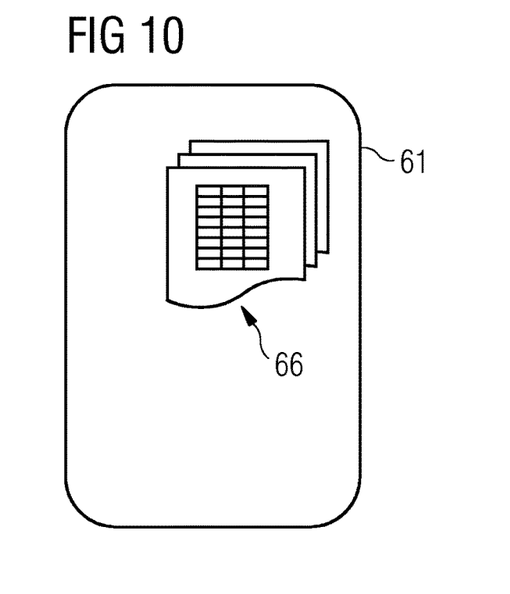
FIG. 10 abstractly illustrates a wind park controller and its configuration with a look-up-table.

In course of this control method, a look-up-table 66 may be accessed from the wind park controller 61. FIG. 10 abstractly illustrates the wind park controller 61 and its configuration with the look-up-table 66.

Such a look-up-table 66 may be present for each wind turbine in the wind park 1. The look-up table 66 may have multiple input parameters, at least the wind direction and the current yaw state. Optionally further input parameter could be used, for example wind speed, wind turbulence and/or information about the profile of the ground. Output parameters may be the hysteresis threshold values and/or the rotor yaw offset angle set point.

Figure 11:
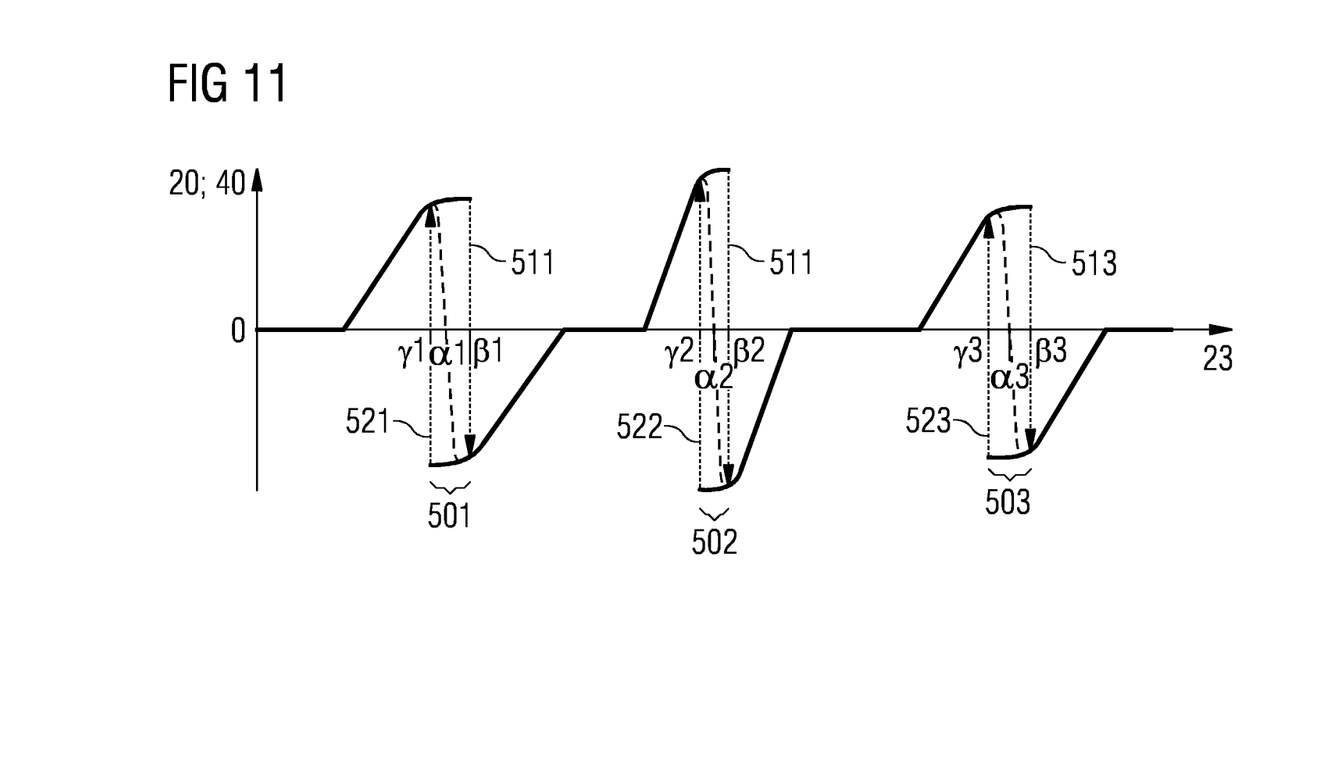
FIG. 11 shows a further exemplary graph of a behaviour of yaw angle control according to embodiments of the invention.

FIG. 11 now shows a variant of FIG. 8, in which a curve for a behaviour of yaw angle control is shown for a selected upstream first turbine and for a wider range wind direction angles. The x-axis and y-axis are the same as in FIG. 7 or 8.

The procedure according to FIG. 11 differs from FIG. 8 that the upstream turbine may create a wake impact on three downstream turbines, downstream from the given upstream turbine. There may be three regions of angles—for each downstream turbine one region—in which a hysteresis can be applied to reduce the number of major yaw angle switching. A first hysteresis 501 may be defined for a first downstream wind turbine, with a theoretical "perfect" angle a1 a first hysteresis threshold with a first switching limit 511 is reached, identified in the curve as angle b1. Then a switchover from positive to negative yaw angles take place, jumping on the graph from the positive rotor yaw offset angle set points to the negative rotor yaw offset angle set points. Once the second branch of the graph is met, the curve can be followed with incremental changes in both directions. If wind direction rotation is reversed, then the curve will be followed on the second branch to the left with incremental changes until a second hysteresis threshold with a second switching limit 521 is reached, identified in the curve as angle g1. If angle g1 is met, there will be again a switch back to positive yaw angles onto the previously discussed branch of the graph, so that the new position again allows wind direction changes without immediately triggering a further switch back to negative yaw angles.

Assuming the position is on the second branch to the right of b1, further increased wind direction rotation in the same direction as before would continue the curve to the right and the negative rotor yaw offset angle set points would decrease in its absolute value. This can would continue to a yaw offset angle set point to zero, at which level the yaw may stay for a wider range of angles. Once the wind turns further in the same direction the yawing will be controlled in a similar way as before, but for a hysteresis 502, identified by the specific hysteresis switching thresholds 512 and 522 for the angles b2 and g2, which have a distant to a theoretical perfect switching angle a2. The curve section for this second downstream turbine may be different from the curve section for the first downstream turbine, particularly with different maximum amplitude and/or with different values for the switching thresholds.

In FIG. 11 then the curve even continues such that for a third downstream turbine a third hysteresis 503 may be implemented with its characteristic angles a3, b3 and g3 and hysteresis switching thresholds 513 and 523.

Thus, the given control method may define pairs of hysteresis switching thresholds for each potential downstream wind turbine for a given upstream turbine.

To summarize, the above discussed solution provides a hysteresis characteristic or hysteresis behaviour when switching between negative and positive yaw angles. By the term "switching" a major change of angle is meant, not only incremental changes passing through angle of zero. For example, the switchover angle for the yaw in reference to the wind direction may be for example +25° and the target angle set point may be −20°. Not covered by the term "switching" shall be an incremental transition from +0.1° via 0° to −0.1° or similar values close around 0°.

It has to be noted that in case of a wind farm where a wind turbine can affect multiple different other wind turbines depending on the wind direction a hysteresis can allow to reduce the number of such switching actions. A hysteresis implementation with multiple transition angles can be implemented. A distance to the closest source for a wake can be calculated or derived. Further a state of look-up-table selection may be calculated as a function of the current state and the distance from the wake creating wind turbine. In this case the look-up-table may be a function that defines yaw angles as a function of at least wind direction and possibly other parameters affecting wake deflection.

The hysteresis function will allow a sharp transition between positive and negative yaw angles to steer the wake away from a downstream turbine in varying wind directions but preventing rapidly repeating transitions between positive and negative reference yaw angles, which the yaw actuator might not be able to track.

The curve as depicted in FIG. 8 may be optimized and derived using model-based optimization based on a wake model, using constraints on the yaw angles to keep them negative or positive. The selection of one of the two curve branches is a function of the turbine alignment angle and a function of the current yaw state of selection. By this a hysteresis is introduced.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for controlling a first wind turbine of a plurality of wind turbines of a wind park, wherein a second wind turbine of the plurality of wind turbines can be affected by a wake region caused by the first wind turbine which is positioned upstream of the second wind turbine, the method comprising:
  determining a current yaw state, wherein the current yaw state is selected from at least one of:
    a) an actual rotor yaw misalignment angle of the first wind turbine, wherein the actual rotor yaw misalignment angle is defined as an angle between a rotating axis of a rotor of the first wind turbine and a current wind direction at the first wind turbine;

b) an identifier representing whether the actual rotor yaw misalignment angle is either in a range of positive yaw misalignment angles or alternatively of negative yaw misalignment angles;

determining a wind condition indicative of a level of potential wake inducement at the second wind turbine caused at least by the first wind turbine, the level of wake inducement being at least represented by a distance between locations of the first wind turbine and the second wind turbine and/or by the current wind direction at the first wind turbine; and defining a rotor yaw offset angle set point for the first wind turbine based on the current yaw state, the wind condition, and at least one yaw angle hysteresis switching threshold, such that the rotor yaw offset angle set point follows a hysteresis, thereby avoiding immediate consecutive switching between a range of positive yaw offset angles and negative yaw offset angles;

the method further comprising:

wherein the step of defining the rotor yaw offset angle set point following a hysteresis is defined by the substeps of: switching an actual rotor yaw misalignment angle with a positive angle to a negative angle if a first one of the at least one yaw angle hysteresis switching threshold is reached, and switching an actual rotor yaw misalignment angle with negative angle to a positive angle if a second one of the at least one yaw angle hysteresis switching threshold is reached; and/or wherein the at least one yaw angle hysteresis switching threshold defines at least a first hysteresis limit for the rotor yaw offset angle set point or the wind direction such that the rotor yaw offset angle set point is limited to an incremental angle difference in case the rotor yaw offset angle set point or the wind direction is below the first hysteresis limit and is switched between positive and negative angle thereby reversing a rotor yaw misalignment angle in case the rotor yaw offset angle set point or the wind direction reaches or would exceed the first hysteresis limit.

2. The method for controlling a first wind turbine of a plurality of wind turbines of a wind park according to claim 1, wherein the at least one yaw angle hysteresis switching threshold is at least determined based on the current wind condition, and/or on the level of wake inducement at the second wind turbine caused at least by the first wind turbine and on an angular distance value, wherein the angular distance value corresponds to a lag for the at least one yaw angle hysteresis switching threshold lagging behind a local optimum for possible yaw angle values for the first wind turbine.

3. The method for controlling a first wind turbine of a plurality of wind turbines of a wind park according to claim 2, wherein the current wind condition is represented by at least one of the following parameters:

a current wind direction, determined for the location of the first wind turbine;

a current wind speed determined for the location of the first wind turbine;

a current wind turbulence determined for the location of the second wind turbine;

a current wake deflection as a misalignment of the wake compared to a wake induced by the first wind turbine with a yaw misalignment angle of zero determined for the location of the second wind turbine or in a region between the first wind turbine and the second wind turbine.

4. The method for controlling a first wind turbine of a plurality of wind turbines of a wind park according to claim 1, wherein the step of defining a rotor yaw offset angle set point is performed such that the yaw angle hysteresis switching threshold defines a switching limit of the hysteresis for the rotor yaw offset angle set point.

5. The method for controlling a first wind turbine of a plurality of wind turbines of a wind park according to claim 4, wherein the step of defining a rotor yaw offset angle set point is performed such that for rotor yaw offset angle set points or for wind directions in a range between two of the yaw angle hysteresis switching thresholds an increased level of wake inducement will not trigger switching between a positive and a negative rotor yaw offset angle set point.

6. The method for controlling a first wind turbine of a plurality of wind turbines of a wind park according to claim 1, wherein the at least one yaw angle hysteresis switching threshold is defined as a plurality of pairs of yaw angle hysteresis switching thresholds, wherein each pair is selected for a specific wind condition or a specific range of wind conditions, the wind conditions being a wind direction and the range of wind conditions being a range of wind directions.

7. The method for controlling a first wind turbine of a plurality of wind turbines of a wind park according to claim 1, wherein following all of the previously defined method steps, the method further comprises:

activating a yaw actuator of the first wind turbine for yawing the first wind turbine until the rotor yaw offset angle set point is reached.

8. The method for controlling a first wind turbine of a plurality of wind turbines of a wind park according to claim 1, wherein prior to all of the previously defined method steps, the method further comprises:

determining, based on the current wind condition, a pair of wind turbines (of the wind park wherein a downstream wind turbine of the pair of wind turbines is or can be affected by a wake region caused by an upstream wind turbine of the pair of wind turbines;

selecting the upstream wind turbine of the pair of wind turbines as the first wind turbine; and selecting the downstream wind turbine of the pair of wind turbines as the second wind turbine.

9. The method for controlling a first wind turbine of a plurality of wind turbines of a wind park according to claim 1, wherein the distance between locations of the first wind turbine and the second wind turbine is calculated based on positioning coordinates of the first and second wind turbine.

10. The method for controlling a first wind turbine of a plurality of wind turbines of a wind park according to claim 1, wherein the defining of the rotor yaw offset angle set point for the first wind turbine is performed by at least accessing a pre-configured look-up-table, wherein accessing the look-up-table returns the rotor yaw offset angle set point.

11. A wind park controller configured to execute the method according to claim 1.

12. A wind park, comprising:

a plurality of wind turbines; and the wind park controller according to claim 11.

13. A method for controlling a first wind turbine of a plurality of wind turbines of a wind park, wherein a second wind turbine of the plurality of wind turbines can be affected by a wake region caused by the first wind turbine which is positioned upstream of the second wind turbine, the method comprising:
- determining a current yaw state, wherein the current yaw state is selected from at least one of:
  a) an actual rotor yaw misalignment angle of the first wind turbine, wherein the actual rotor yaw misalignment angle is defined as an angle between a rotating axis of a rotor of the first wind turbine and a current wind direction at the first wind turbine;
  b) an identifier representing whether the actual rotor yaw misalignment angle is either in a range of positive yaw misalignment angles or alternatively of negative yaw misalignment angles; determining a wind condition indicative of a level of potential wake inducement at the second wind turbine caused at least by the first wind turbine, the level of wake inducement being at least represented by a distance between locations of the first wind turbine and the second wind turbine and/or by the current wind direction at the first wind turbine; and
- defining a rotor yaw offset angle set point for the first wind turbine based on the current yaw state, the wind condition, and at least one yaw angle hysteresis switching threshold, such that the rotor yaw offset angle set point follows a hysteresis, thereby avoiding immediate consecutive switching between a range of positive yaw offset angles and negative yaw offset angles;
- wherein the step of defining the rotor yaw offset angle set point following a hysteresis is defined by the substeps of:
- switching an actual rotor yaw misalignment angle with a positive angle to a negative angle if a first one of the at least one yaw angle hysteresis switching threshold is reached, and
- switching an actual rotor yaw misalignment angle with negative angle to a positive angle if a second one of the at least one yaw angle hysteresis switching threshold is reached.

14. A method for controlling a first wind turbine of a plurality of wind turbines of a wind park, wherein a second wind turbine of the plurality of wind turbines can be affected by a wake region caused by the first wind turbine which is positioned upstream of the second wind turbine, the method comprising:
- determining a current yaw state, wherein the current yaw state is selected from at least one of:
  a) an actual rotor yaw misalignment angle of the first wind turbine, wherein the actual rotor yaw misalignment angle is defined as an angle between a rotating axis of a rotor of the first wind turbine and a current wind direction at the first wind turbine;
  b) an identifier representing whether the actual rotor yaw misalignment angle is either in a range of positive yaw misalignment angles or alternatively of negative yaw misalignment angles; determining a wind condition indicative of a level of potential wake inducement at the second wind turbine caused at least by the first wind turbine, the level of wake inducement being at least represented by a distance between locations of the first wind turbine and the second wind turbine and/or by the current wind direction at the first wind turbine; and
- defining a rotor yaw offset angle set point for the first wind turbine based on the current yaw state, the wind condition, and at least one yaw angle hysteresis switching threshold, such that the rotor yaw offset angle set point follows a hysteresis, thereby avoiding immediate consecutive switching between a range of positive yaw offset angles and negative yaw offset angles;
- wherein the at least one yaw angle hysteresis switching threshold defines at least a first hysteresis limit for the rotor yaw offset angle set point or the wind direction such that the rotor yaw offset angle set point is limited to an incremental angle difference in case the rotor yaw offset angle set point or the wind direction is below the first hysteresis limit and is switched between positive and negative angle thereby reversing a rotor yaw misalignment angle in case the rotor yaw offset angle set point or the wind direction reaches or would exceed the first hysteresis limit.

\* \* \* \* \*